Aug. 20, 1929.   C. W. WEISS   1,724,983
ROLLER CLUTCH BEARING
Filed March 31, 1927   2 Sheets-Sheet 1
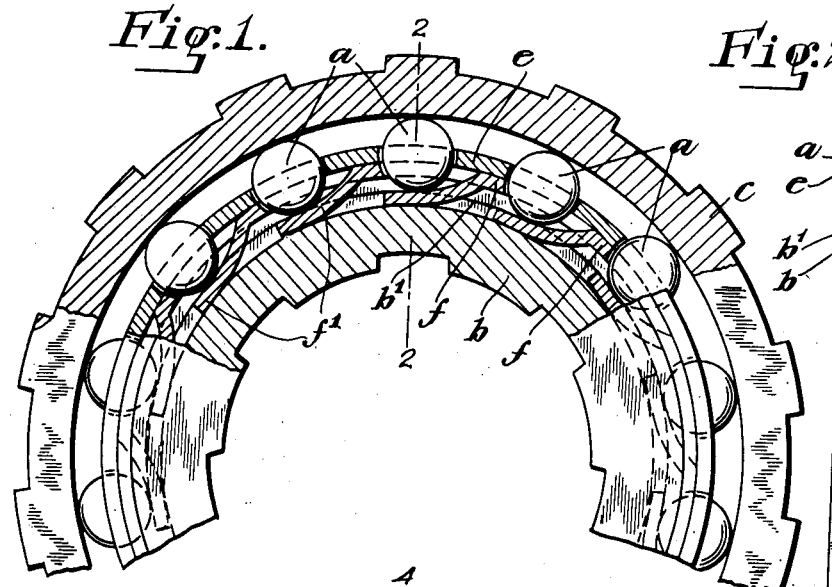
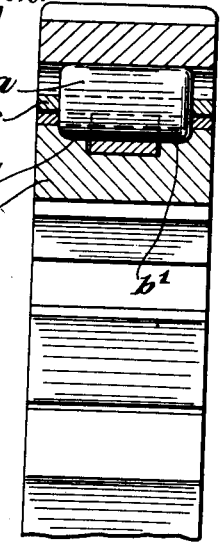
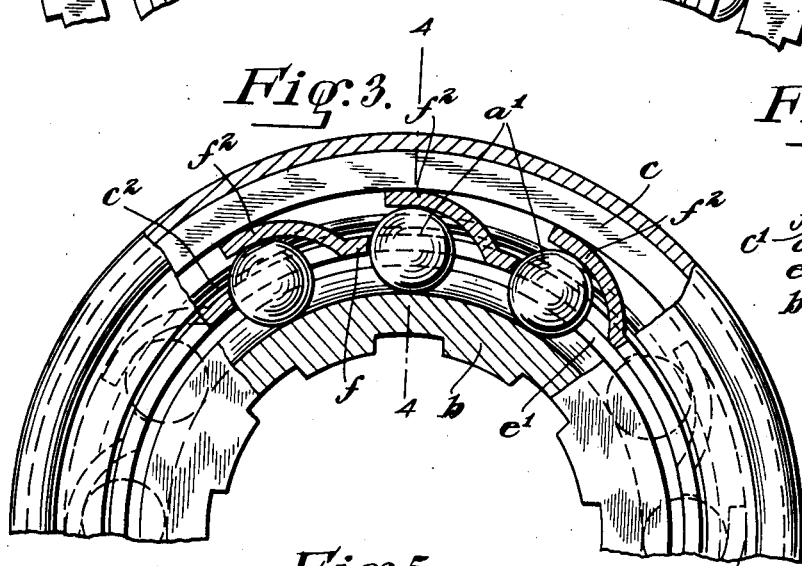
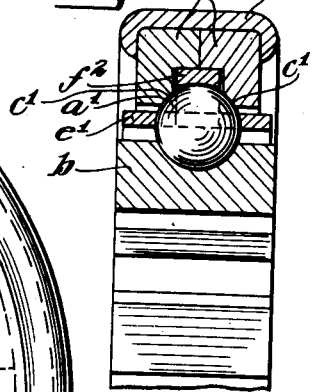
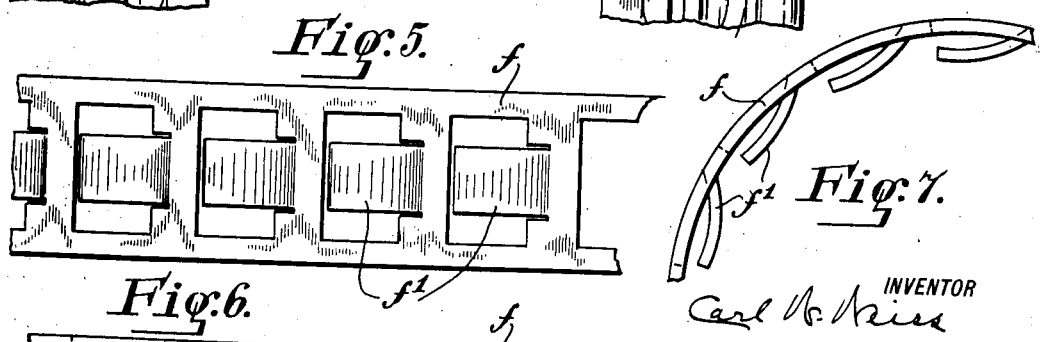

Aug. 20, 1929.   C. W. WEISS   1,724,983
ROLLER CLUTCH BEARING
Filed March 31, 1927   2 Sheets-Sheet 2
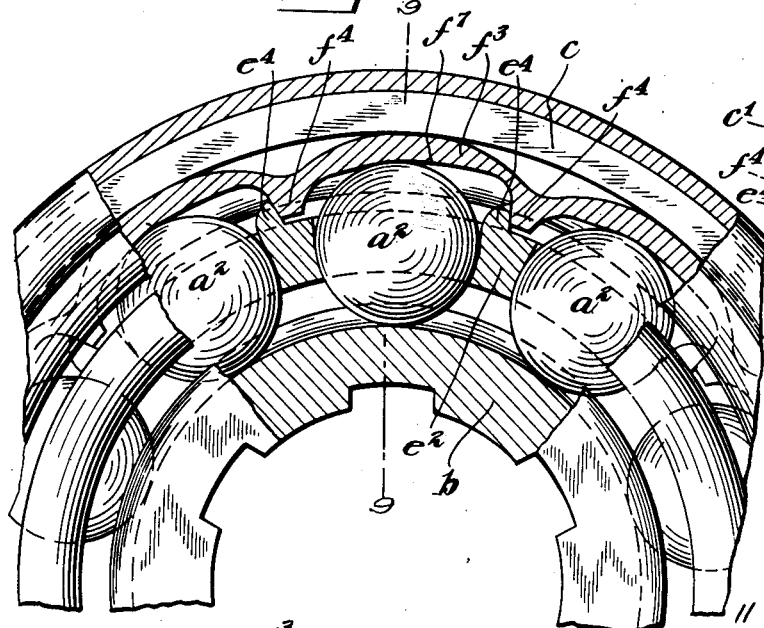
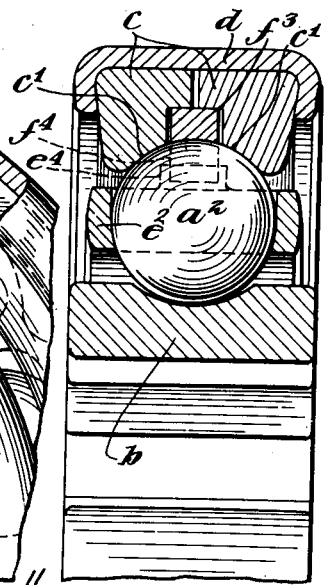
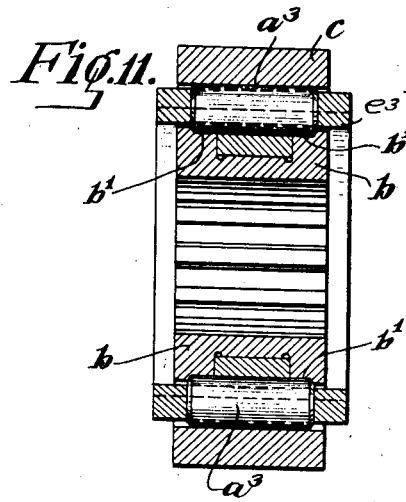
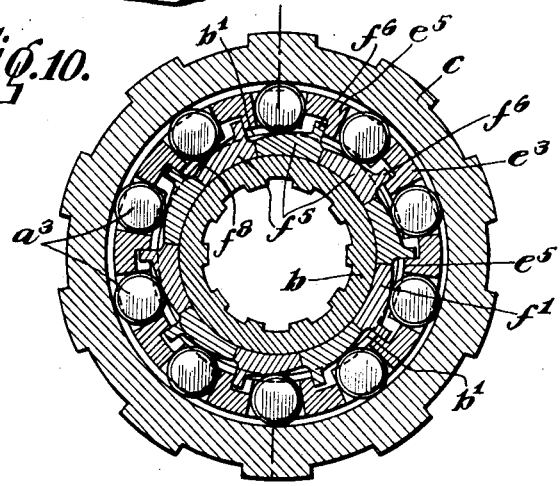
INVENTOR
Carl W. Weiss
BY Redding, Greeley, O'Shea & Campbell
ATTORNEYS Patented Aug. 20, 1929.

1,724,983

UNITED STATES PATENT OFFICE.

CARL W. WEISS, OF BROOKLYN, NEW YORK.

ROLLER-CLUTCH BEARING.

Application filed March 31, 1927. Serial No. 179,734.

It is sometimes desirable, in one mechanism or another, to provide in the mechanism a uni-directional clutch in which the clutching action, either for the purpose of effecting rotation of one member from the other or of preventing rotation of one member, as in a reactance device, shall take place when one member is rotated in one direction only, while free rotation of such member in the opposite direction is permitted. The desired result is sometimes accomplished by the provision of one set of balls or rollers by which the clutching action is effected in one direction of rotation and another set of balls or rollers which support the rotating member for rotation in the opposite direction. It is the object of this invention to provide an improved roller clutch bearing in which one set of rollers, whether spherical or cylindrical, serves both functions, effecting the clutching action in one direction of rotation and supporting the rotating member for rotation in the opposite direction. The improved construction may also provide for such cushioning of the rollers that the clutch shall not go into action with a shock.

The invention will be more fully explained hereinafter with reference to the accompanying drawings in which it is illustrated and in which:

Figure 1 is a partial view, partly in elevation and partly in section transverse to the axis, of one embodiment of the invention, with the locking member interposed between the rollers and the inner member.

Figure 2 is a view of the same in sectional elevation on a radial plane of section.

Figures 3 and 4 are views generally similar to Figures 1 and 2, but with balls in place of rollers and the locking member interposed between the balls and the outer member.

Figures 5 and 6 are detail views in plan and in side elevation of a portion of a steel strip stamped out to form a locking member.

Figure 7 is a view of the same in side elevation but bent to conform to the curvature of the inner and outer members.

Figures 8 and 9 are detail views generally similar to Figures 3 and 4, in which the locking member is interposed between the balls and the outer member.

Figures 10 and 11 are views similar to Figures 1 and 2 respectively, but illustrative of a slightly different embodiment of the invention.

For convenience, the interposed, rolling devices $a$, $a'$, $a^2$, $a^3$, whether spherical or cylindrical, will be termed rollers. The annular members between which the rollers are interposed, are referred to herein respectively as the inner member $b$, and the outer member $c$. These members are substantially alike in the construction shown in the several figures of the drawings. In Figures 1, 2, 10 and 11 they are shown each as one-piece rings, suitably formed, while in Figures 3, 4, 8 and 9 the outer members $c$ are shown as two-part rings, the two parts being shown as held in operative relation by a flanged ring $d$. In the several embodiments of the invention, the rollers $a$, $a'$, $a^2$, $a^3$ are uniformly spaced by a cage or spacer $e$, $e'$, $e^2$, $e^3$ independent of the members $b$ and $c$. In the construction shown in Figures 1 and 3 the cages or spacers $e$, $e'$ are shown as plain rings formed with openings to receive the rollers. In the construction shown in Figures 8 and 9 the spacer is also shown as a continuous ring $e^2$, but formed on its outer periphery with lugs $e^4$ for a purpose to be explained. In the construction shown in Figures 10 and 11 the spacer $e^3$ is also shown as a continuous ring, but with lugs $e^5$ on its inner side for a purpose to be explained.

In each embodiment of the invention there is provided for cooperation with the rollers what may be termed, for convenience, a locking ring, which is independent of and separate from the members $b$ and $c$. In the construction shown in Figures 1 and 2 the locking ring $f$ is stamped out of spring steel and is formed with tongues $f'$ which underlie the rollers $a$ severally and in such position with respect to the rollers that in one direction of rotation the rollers do not contact with the inner member $b$ but with the tongues $f'$ which are severally interposed between the rollers and the inner member $b$, rest only at their extremities on the inner member $b$ and are spaced therefrom slightly so that when the rollers bite, in the clutching operation, as they roll up on the upper surfaces of the tongues, the tongues yield slightly and so cushion the rollers and prevent the hammer-like shock with which a roller clutch commonly goes into action.

In the construction shown in Figures 1 and 2 the tongues $f'$ are interposed between the rollers and the inner member of the bearing, while in the construction shown in Figures 3 and 4 the tongues $f^2$ are interposed between the rollers and the outer member of the bearing. In the construction shown in Figures 1 and 3 the cushioning retainers or locking rings are stamped out of spring steel, while in the construction shown in Figures 8 and 9 the cushioning retainer or locking ring $f^3$ is interposed between the rollers and the outer member of the bearing, is milled out instead of being stamped out and in this instance is formed with lugs $f^4$ which coact with the lugs $e^4$ of the spacer $e^2$, so as to prevent the dragging of the locking ring on the outer member $c$.

In the construction shown in Figures 10 and 11 the locking ring is made up of a series of sections $f^5$, one for each roller $a^3$, which rest on the inner member $b$ and are provided with lugs $f^6$ which coact with the corresponding lugs $e^5$ of the spacer $e^3$.

In the construction shown in Figures 1 and 2 the tongues $f'$, as will be observed, form inclined surfaces, so that in the rotation of the outer member $c$ from right to left the rollers roll free of the inclined surfaces and rest on the shoulders $b'$ of the inner member $b$ so that the outer member is supported for free rotation on the rollers, while in the event of a slight movement of the outer member in the opposite direction the rollers roll up on the inclined surfaces and thereby the rollers bind against the outer member while pressing the tongues against the inner member and effecting a driving engagement between the inner and outer members, that is, an engagement which does not permit relative movement of the two members. As the tongues are in contact with the inner member only at their extremities, the tongues yield slightly as the rollers roll up on them and thereby cushion the rollers and permit the driving engagement to be effected without shock.

In the construction shown in Figures 3 and 4 the locking ring $f$ is formed with inclined tongues $f^2$ which function in a manner similar to that already described, but in this instance are interposed between the rollers $a'$ and the outer member $c$, the balls being pressed against the inner member in one direction of rotation, as they roll up on the inclined surfaces formed by the tongues, while the tongues themselves are pressed against the outer member. In the opposite direction, the rollers are free of the inclined surfaces and rest on the shoulders $c'$ of the outer member.

In the construction shown in Figures 8 and 9 the inclined surfaces are formed as at $f^7$ in the milling of the locking ring and the rollers coact with such inclined surfaces in the manner already described, crowding the locking ring against the outer member while being themselves pressed against the inner member. In this construction also the rollers are cushioned and shock is prevented. It will be understood that the locking ring shown in Figures 8 and 9 is not rigid or inflexible in an absolute sense but, as indicated by its formation, has a certain degree of flexibility and resilience so that when the rollers coact with the inclined inner surfaces of the ring the ring itself is pressed outwardly through the very slight normal clearance, of a few thousandths of an inch in the line of pressure, until the locking ring is crowded against the outer member, while the rollers themselves, through the cam action of the inclined surfaces, are pressed against the inner member.

In the construction shown in Figures 10 and 11 the inclined surfaces $f^8$ are formed severally on the several sections $f^5$ which make up the locking ring $f$ and the rollers $a^3$ coact therewith in the manner already described, crowding the sections $f^5$ against the inner member $b$ and being themselves pressed against the outer member $c$, but in the opposite direction of rotation resting on the shoulders $b'$ of the inner member.

It will be understood that various changes in details of construction and arrangement can be made to suit different conditions in which it is desired to provide a unidirectional roller clutch, the rollers of which shall function to effect the clutching action in one direction of rotation and in the other direction of rotation to support the one member upon the other for free rotation, and that the invention, except as pointed out in the accompanying claims, is not restricted to one or another of the particular embodiments shown and described herein.

I claim as my invention:

1. A roller clutch bearing having an inner member, an outer member, and interposed rollers, and in which a locking ring independent of the inner and outer members also interposed between the inner and the outer members is formed with inclined yielding surfaces on which, in one direction of rotation, the rollers roll to effect driving engagement between the inner and outer members, while in the opposite direction the rollers support one of said members for free rotation with respect to the other of said members.

2. A roller clutch bearing having an inner member, an outer member, and interposed rollers, and in which a locking ring also interposed between the inner and the outer members is formed with inclined tongues bearing at their extremities on one of the members and on which, in one direction of rotation, the rollers roll to effect driving engagement between the inner and outer members, while in the opposite direction the rollers support one of said members for free rotation with respect to the other of said members.

This specification signed this 29th day of March A. D. 1927.

CARL W. WEISS.